(12) United States Patent
Chen et al.

(10) Patent No.: US 7,009,859 B2
(45) Date of Patent: Mar. 7, 2006

(54) DUAL INPUT DC-DC POWER CONVERTER INTEGRATING HIGH/LOW VOLTAGE SOURCES

(75) Inventors: Yaow-Ming Chen, Chia-Yi (TW); Yuan-Chuan Liu, Chia-Yi (TW)

(73) Assignee: National Chung Cheng University, Chia-Yi (TW)

( * ) Notice: Subject to any disclaimer, the term of this patent is extended or adjusted under 35 U.S.C. 154(b) by 206 days.

(21) Appl. No.: 10/720,205

(22) Filed: Nov. 25, 2003

(65) Prior Publication Data

US 2005/0068010 A1    Mar. 31, 2005

(30) Foreign Application Priority Data

Sep. 30, 2003    (TW) .............................. 92126947 A

(51) Int. Cl.
*H02M 7/00*    (2006.01)
*H02J 1/00*    (2006.01)

(52) U.S. Cl. .......................................... 363/65; 307/75

(58) Field of Classification Search ............... 363/65, 363/71; 307/69–72, 75, 77, 82, 85, 86
See application file for complete search history.

(56) References Cited

U.S. PATENT DOCUMENTS

| | | | | |
|---|---|---|---|---|
| 5,337,205 | A * | 8/1994 | Haun et al. | 361/56 |
| 6,281,724 | B1 * | 8/2001 | Ellis | 327/143 |
| 6,370,047 | B1 * | 4/2002 | Mallory | 363/65 |
| 6,566,766 | B1 * | 5/2003 | Matsuda et al. | 307/82 |
| 6,614,671 | B1 * | 9/2003 | Thrap | 363/67 |
| 6,650,560 | B1 * | 11/2003 | MacDonald et al. | 363/142 |
| 6,744,151 | B1 * | 6/2004 | Jackson et al. | 307/43 |

\* cited by examiner

*Primary Examiner*—Matthew V. Nguyen
(74) *Attorney, Agent, or Firm*—Rosenberg, Klein & Lee

(57) ABSTRACT

A dual input DC—DC power converter integrating high/low voltages can simultaneously or individually transfer the power from two input power sources respectively having voltages higher than and lower than an output voltage to a load end. If one power source is failed, the other power source can still transfer power normally. Moreover, if an appropriate control circuit is matched, the currents and powers of the two input DC power sources can be accurately controlled to accomplish tracking operations of the maximum power of each power source. The power conversion system can be exactly simplified to accomplish the effects of enhanced efficiency and lowered cost and also have the advantage of simultaneous transmission of power from two voltage sources to the load end.

20 Claims, 8 Drawing Sheets

DUAL INPUT DC-DC POWER CONVERTER INTEGRATING HIGH/LOW VOLTAGE SOURCES

FIELD OF THE PRESENT INVENTION

The present invention relates to a power converter and, more particularly, to a dual input DC—DC power converter integrating high/low voltage sources. The converter can simultaneously or individually transfer the power from two input power sources respectively having voltages higher than and lower than an output voltage to a load end.

BACKGROUND OF THE PRESENT INVENTION

Along with development and exploitation of renewable energy like solar cells and wind turbines, the sources of power become diversified. In order to acquire higher power conversion efficiencies, it is not appropriate to connect too many solar cell panels in series. Under the same rated power, solar cell panels are usually installed as a parallel-connected module having a low voltage and a large current, i.e., a low voltage source. In order to reduce the loss caused by the armature current, a wind turbine usually adopts a winding design having a high voltage and a small current, i.e., a high voltage source. In consideration of these differences, a dual input DC—DC power converter is required for directly integrating DC power sources of different electrical specifications from the solar cell panels and the wind turbine.

Although many methods for paralleling DC sources have been developed, there are limits and drawbacks, especially for these with obvious voltage amplitudes differences. In a conventional method, after two DC voltage sources are respectively processed by two individual DC—DC power converters, stable and identical output voltages are obtained. These two voltage sources are then connected in parallel to a DC bus to provide power for a load. However, because two DC—DC power converters are required, the whole circuit architecture of the power conversion system will be complicated, the efficiency will be inferior, and the cost will be high. In another conventional method, two voltage sources are connected in series to form an input power source, which is connected to a DC—DC power converter to achieve the required electrical specification of the load. However, a switching bypass is required at the series input end of the voltage source so that another power source can still provide electric energy when one power source fails. Therefore, the structure can not be effectively simplified, and the operation is inconvenient.

Besides, in yet another conventional method, two DC voltage sources are connected in parallel to form an input power source, which is connected to a DC—DC power converter to achieve the required electrical specification of the load. Because of different voltage levels of the two parallel-connected voltage sources, it is necessary to adopt a time-sharing control method. However, at a certain time, only a voltage source can be connected to the power converter to provide power for the load end. That is, the two voltage sources can not simultaneously transfer power to the load end.

Accordingly, the present invention aims to provide a dual input DC—DC power converter suitable for a high and a low voltage sources to effectively solve the problems in the prior art.

SUMMARY OF THE PRESENT INVENTION

The primary object of the present invention is to provide a dual input DC—DC power converter, which is a single power converter, and can replace two traditional DC—DC power converters required for two parallel-connected voltage sources in the prior art. Therefore, the power conversion system can be exactly simplified, the efficiency can be effectively improved, and the cost can be relatively reduced.

Another object of the present invention is to provide a dual input DC—DC power converter having obvious voltage amplitude differences of two input voltage sources (one of two voltage is higher than the output voltage while the other is lower than the output voltage) that can be applied to the application of integrating different voltage sources with unique characteristics. If one of two input voltage sources is failed, the other can still deliver power to the load end normally, hence effectively solving the drawback and inconvenience of using a switching bypass.

Another object of the present invention is to provide a dual input DC—DC power converter, whereby two voltage sources can simultaneously transfer power form two different voltage sources to a load end to avoid the limitation of time-sharing control for paralleling two DC voltage sources with different amplitude in the prior art.

Another object of the present invention is to provide a dual input DC—DC power converter, wherein a soft-switching cell can be easily inserted to effectively reduce the switching loss and improve the efficiency of the power converter.

In accordance with the present invention, a dual input DC—DC power converter integrating high/low voltage sources, providing an output voltage to a load end, is described. The power converter comprises an electric storage device for charging and discharging of electric energy. A power supply device is connected in series with the electric storage device. The power supply device is composed of a high voltage source device and a low voltage source device with series connection. The voltage levels of the high and low voltage source devices are higher and lower than the output voltage, respectively. A first switch and a second switch are provided in the high and low voltage source devices, respectively. The power supply device forms a switching circuit with different operation modes according to the on/off state of the two switches. When the power switch is on, the high voltage source device or/and the low voltage source device will charge the electric storage device. When the power switch is off, the electric storage device will release energy to the load end. If an appropriate control circuit is matched, the currents and powers of the two input DC power sources can be accurately controlled.

This invention has been summarized above and described with reference embodiment. Some processing details have been omitted and are understood by those skilled in the art. More details of this invention are started in the "DESCRIPTION OF THE PREFERRED EMBODIMENTS" section.

DETAILED DESCRIPTION OF THE PREFERRED EMBODIMENTS

The present invention provides a dual input DC—DC power converter especially suitable for high/low voltage sources. The converter can directly integrate two power sources having much different electric characteristics from different renewable energy sources and can individually or simultaneously transfer the power from the two power sources to a load end. If an appropriate control circuit is matched, the currents and powers of the two input DC power sources can be accurately controlled.

Figure 1:
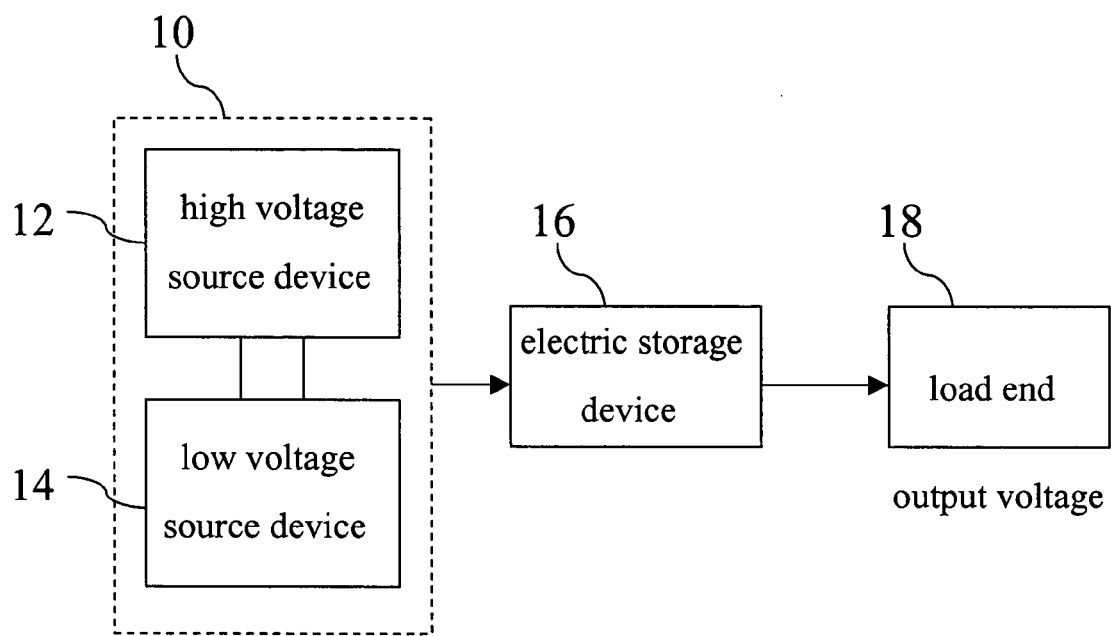
FIG. 1 is a circuit block diagram of the present invention.

As shown in FIG. 1, a dual input DC—DC power converter of the present invention comprises a power supply device 10, which is formed by series connecting a high voltage source device 12 and a low voltage source device 14. An electric storage device 16 is connected in series with the power supply device 10 for charging and discharging of electric energy. The dual input DC—DC power converter provides an output voltage for a load end 18. In this circuit architecture, the voltage level of the high voltage source device 12 is higher than the output voltage while the voltage level of the low voltage source device 14 is lower than the output voltage. A first switch and a second switch are provided in the high voltage source device 12 and the low voltage source device 14, respectively. Typically, first and second switches are transistors. The power supply device 10 forms a switching circuit with different operation modes according to the on/off states of the two switches. When the power switch is on, the high voltage source device 12 or/and the low voltage source device 14 will charge the electric storage device 16. When the power switch is off, the electric storage device 16 will release energy to the load end 18.

Figure 2:
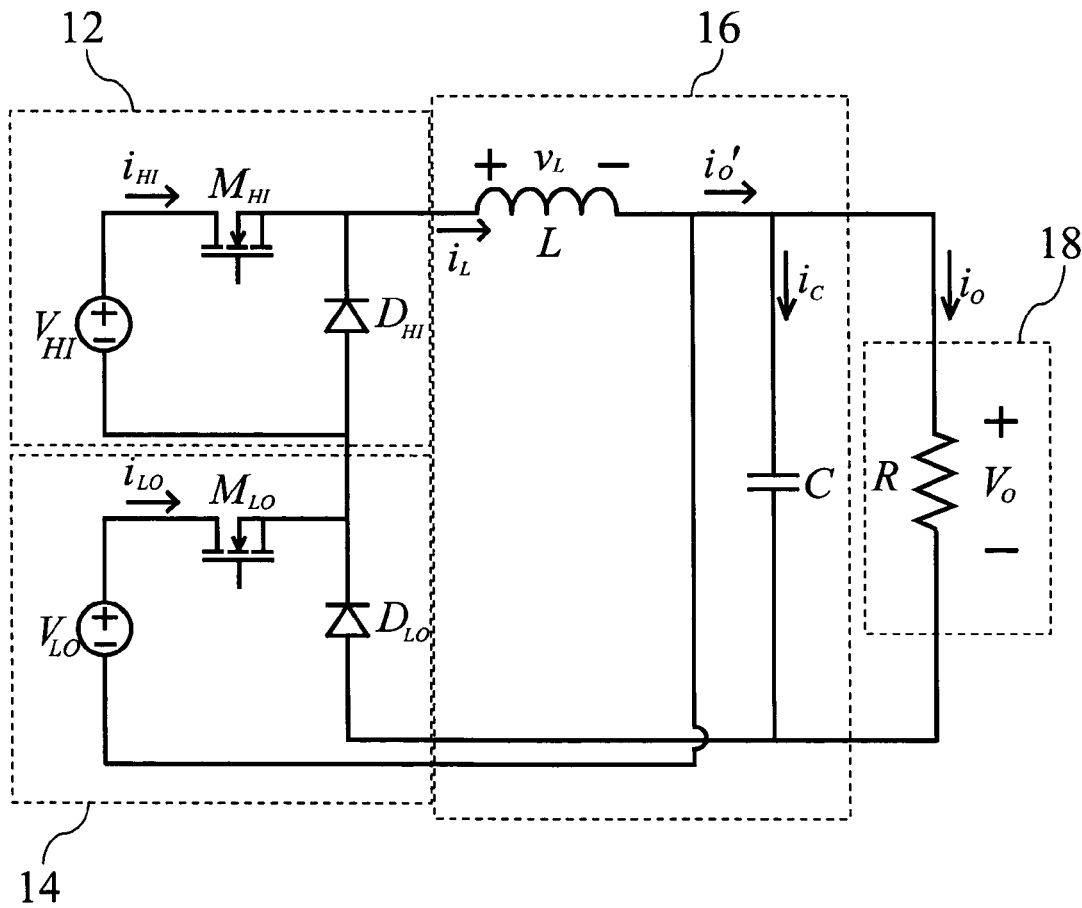
FIG. 2 is a detailed circuit diagram of the present invention.

Referring to FIG. 2, the electric storage device 16 is formed by series connecting an inductor L and a capacitor C. The inductor L is connected in series with the power supply device 10. A voltage source $V_{HI}$ having a high voltage level is provided in the high voltage source device 12, a voltage source $V_{LO}$ having a low voltage level is provided in the low voltage source device 14, and $V_O$ is the output voltage of the load end 18, where $V_{HI} > V_O > V_{LO}$. Besides, switches $M_{HI}$ and $M_{LO}$ are provided at output ends of the high and low voltage sources $V_{HI}$ and $V_{LO}$, respectively. Both the switches $M_{HI}$ and $M_{LO}$ are transistors. The two switches $M_{HI}$ and $M_{LO}$ are connected to diodes $D_{HI}$ and $D_{LO}$, respectively. When the switches $M_{HI}$ and $M_{LO}$ are off, the two diodes $D_{HI}$ and $D_{LO}$ will provide paths for the current of the inductor L to flow.

According to the on or off states of the switches $M_{HI}$ and $M_{LO}$, the circuit of the present invention has four different operation modes described below.

Mode 1: $M_{HI}$ is on; $M_{LO}$ is off

Figure 3A:
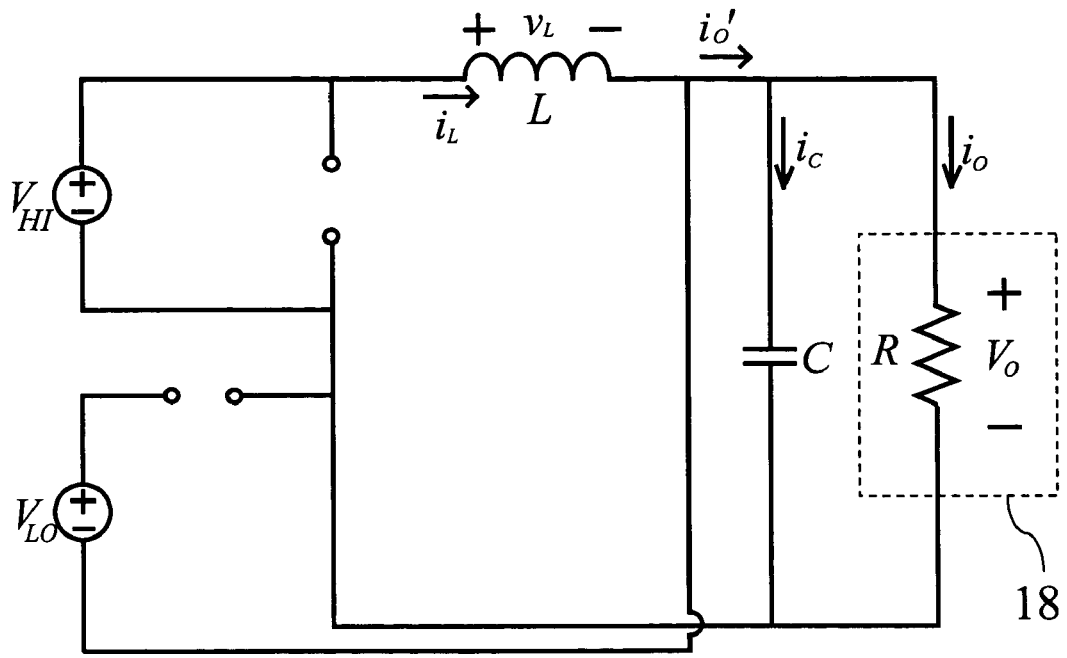
FIGS. 3(a) to 3(d) show equivalent circuits in four different operation modes.

Since the switch $M_{HI}$ is on, the diode $D_{HI}$ is reverse biased and hence is off-meaning an open circuit. On the other hand, since the switch $M_{LO}$ is off, the diode $D_{LO}$ is forcedly on due to the inductor's current. The equivalent circuit of this mode is shown in FIG. 3(a), wherein the high voltage source $V_{HI}$ provides power for the load end 18 and charges the inductor L and the capacitor C. This mode is equivalent to an energy charging stage in a buck converter when the power switch is on.

Mode 2: $M_{HI}$ is off; $M_{LO}$ is on

Figure 3B:
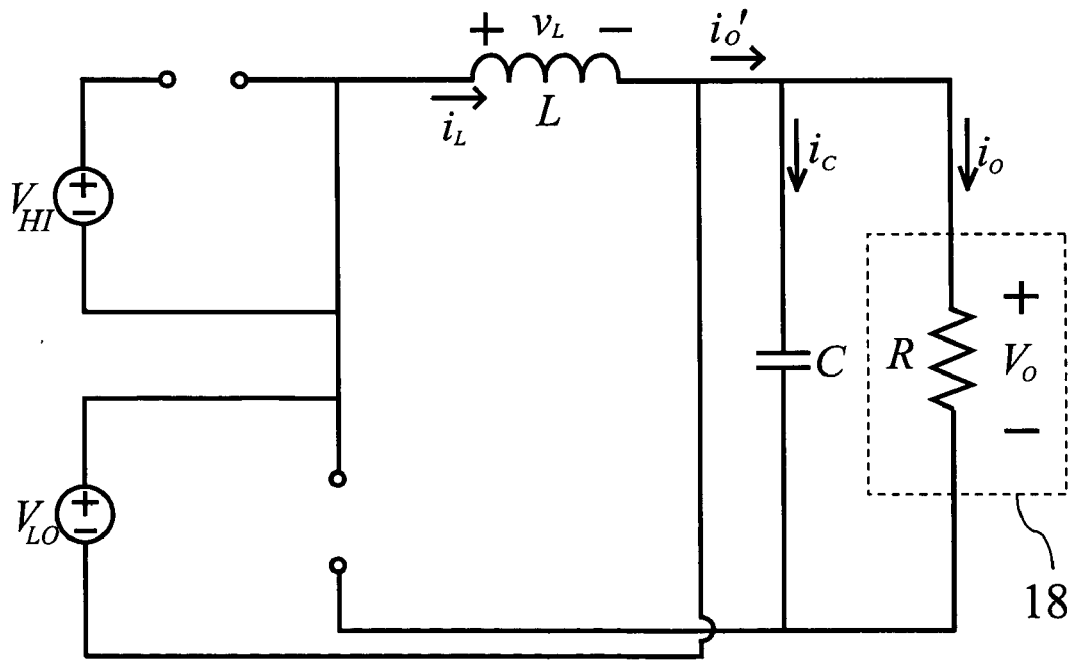

Since the switch $M_{HI}$ is off and the switch $M_{LO}$ is on, the diode $D_{HI}$ is on—meaning a short circuit, and the diode $D_{LO}$ is off—meaning an open circuit. The equivalent circuit of this mode is shown in FIG. 3(b), wherein only the low voltage source $V_{LO}$ charges the inductor L, and the capacitor C provides power for the load end 18. This mode is equivalent to an energy charging stage in a buck-boost converter when the power switch is on.

Mode 3: $M_{HI}$ is off; $M_{LO}$ is off

Figure 3C:
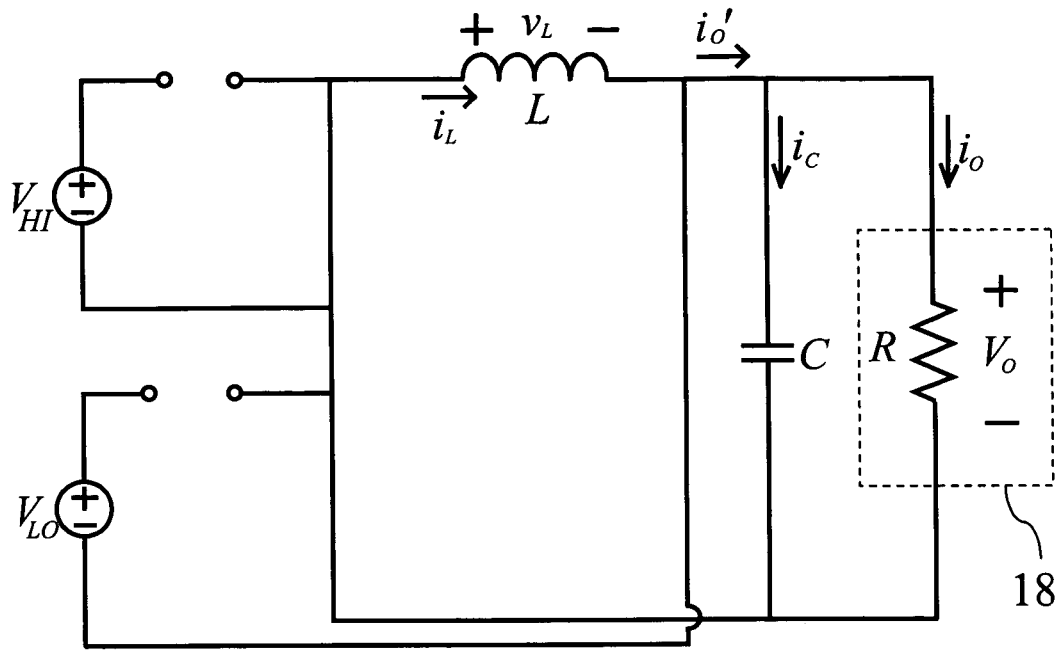

Because both the switch $M_{HI}$ and the switch $M_{LO}$ are off, the diodes $D_{HI}$ and $D_{LO}$ are forcedly on due to the inductor's current-meaning short circuits. The equivalent circuit of this mode is shown in FIG. 3(c), wherein the energy stored in the inductor L will be released to the load end 18. This mode is equivalent to an energy discharging stage in a buck and buck-boost converter.

Mode 4: $M_{HI}$ is on; $M_{LO}$ is on

Figure 3D:
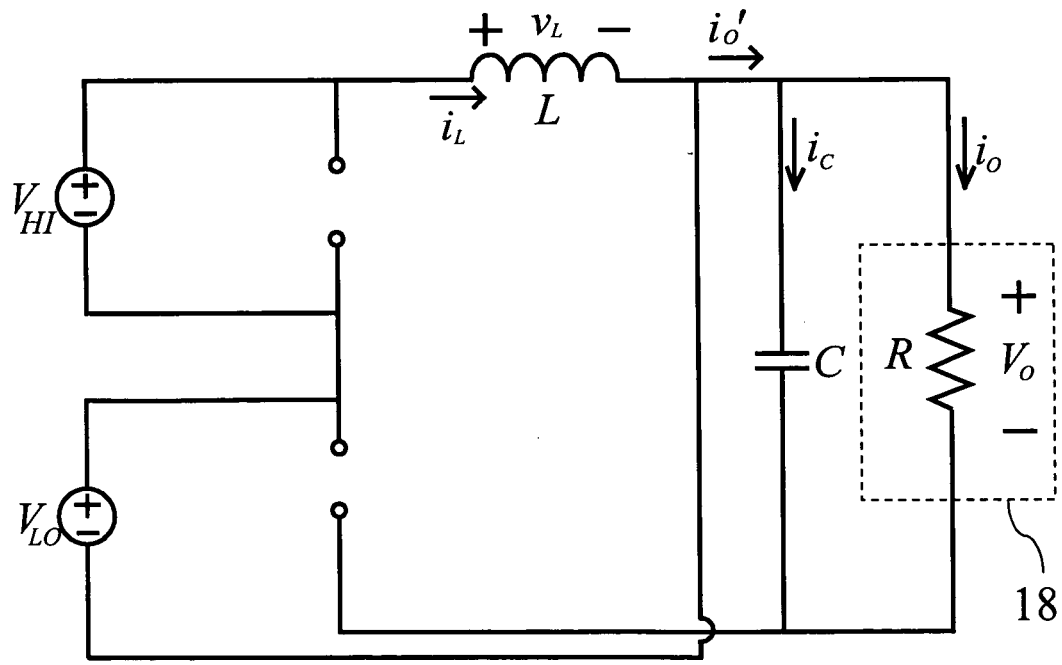

Since both the switch $M_{HI}$ and $M_{LO}$ are on, the diodes $D_{HI}$ and $D_{LO}$ are reverse biased and hence are off. The equivalent circuit of this mode is shown in FIG. 3(d), wherein the high voltage source $V_{HI}$ and the low voltage source $V_{LO}$ are connected in series to charge the inductor L, and the capacitor C provides power for the load end 18. This mode is equivalent to an energy charging stage in a buck-boost converter. The high and low voltage sources $V_{HI}$ and $V_{LO}$ will simultaneously transfer power to the power converter.

In principle, the switching frequencies of the two switches $M_{HI}$ and $M_{LO}$ can be different. However, in order to reduce electromagnetic interference and facilitate filter design, it is preferred to keep the switching frequencies of the two switches $M_{HI}$ and $M_{LO}$ synchronous. In the situation that the switching frequencies are synchronous, the two switches $M_{HI}$ and $M_{LO}$ can be simultaneously on but consecutively off or consecutively on but simultaneously off. Because both the above two ways can meet the requirement in circuit functions, the latter switching way will be illustrated below.

Figure 4:
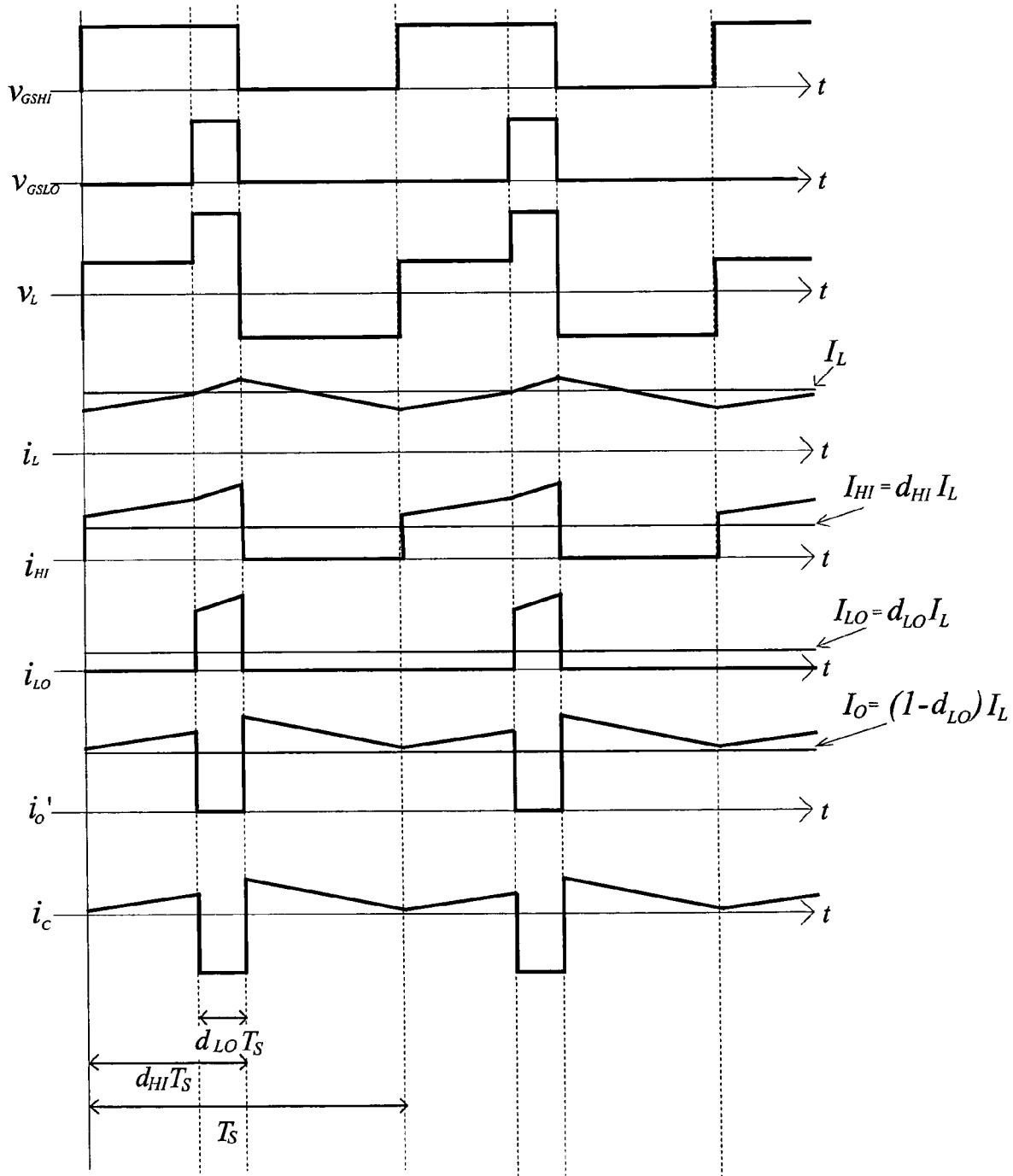
FIG. 4 shows the key voltage and current waveforms of the circuit of the present invention when two switches are consecutively on but simultaneously off.

FIG. 4 shows from top to bottom the control voltages $v_{GSHI}$ and $v_{GSLO}$ of the switches $M_{HI}$ and $M_{LO}$, the voltage $v_L$ of the inductor L, the current $i_L$ of the inductor L, the input current $i_{HI}$ of the high voltage source, the input current $i_{LO}$ of the low voltage source, the output current $i_O$ not yet filtered by the capacitor C and the current $i_C$ of the capacitor C.

As shown in FIG. 4, the two switches $M_{HI}$ and $M_{LO}$ have different duty ratios. The high voltage source has a larger duty ratio. The voltage across the inductor L has three different stages of voltage level due to the conduction state of the switches, but still conform to the volt-second balance principle. The inductor current $i_L$ is affected by the variation of the inductor voltage $v_L$ and thus also has three different rise and drop stages. From the input currents $i_{HI}$ and $i_{LO}$, the two voltage sources can simultaneously or individually transfer power to the load end. On the other hand, the alternating capacitor current will cancel out the ripple current caused by the variation of the inductor current $i_L$ to let the load end have a constant output current. Besides, if the input DC power source comes from a rectifying circuit of an AC power source, the present invention can also accomplish the power factor correction at the input AC power source end.

Figure 5A:
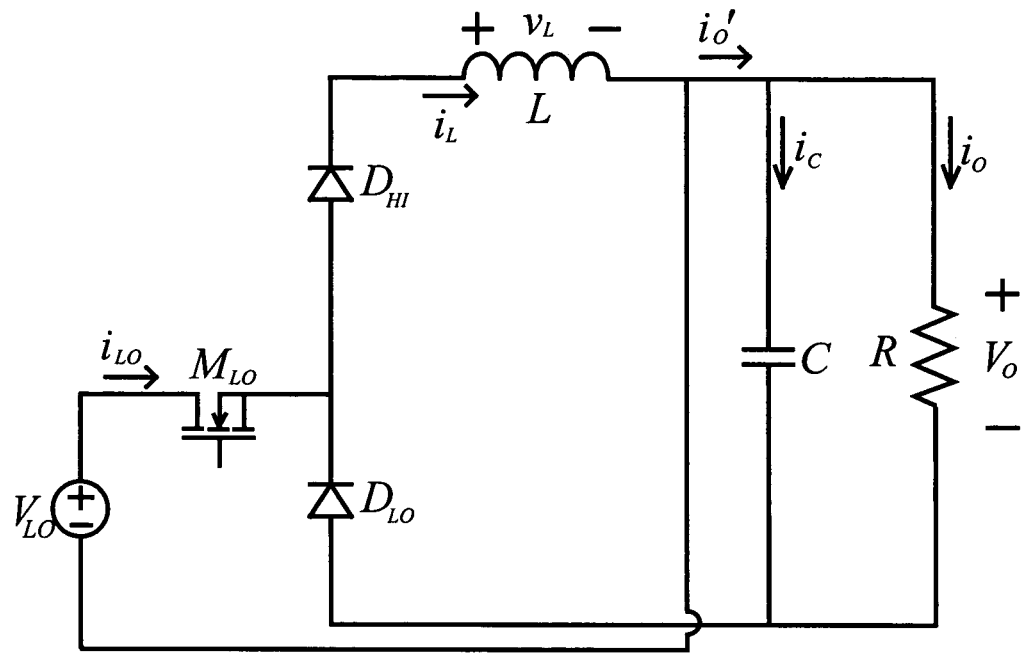
FIGS. 5(a) and 5(b) show equivalent circuits of the present invention when the high voltage source fails and the low voltage source fails, respectively.
Figure 5B:
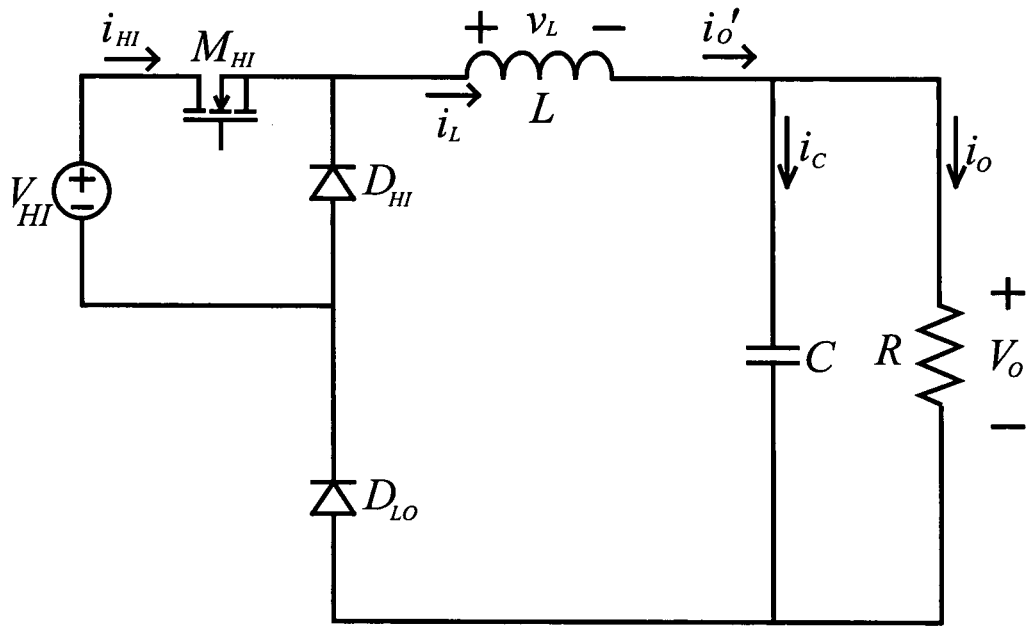

In the dual input DC—DC power converter of the present invention, the two power sources can simultaneously provide power for the load end. If one of the two power sources fails, the other power source can still provide power for the load end normally. As shown in FIGS. 5(a) and 5(b), if unnecessary open-circuit branches are properly removed and the two always-on diodes $D_{HI}$ and $D_{LO}$ are replaced with short-circuit leads, the circuits in FIGS. 5(a) and 5(b) will be the same as a conventional buck-boost converter and a conventional buck converter, respectively. Therefore, this DC—DC power converter will be immune to the influence of the failed power source, and can still stably provide power for the load end.

The relation between the output voltage and input voltages of the present invention's circuit can be obtained from the voltage-second balance principle of the inductor at steady state. Exemplified with the voltage and current waveforms in FIG. 4, the equivalent circuit of the present invention's circuit in a period is mode 1, mode 4 and mode 3 in order. Therefore, the following relation can be obtained:

$$(d_{HI}-d_{LO})T_s(V_{HI}-V_O)+d_{LO}T_s(V_{HI}+V_{LO})+(1-d_{HI})T_s(-V_O)=0 \quad (1)$$

where $d_{HI}$ and $d_{LO}$ are conduction duty ratios of the switches $M_{HI}$ and $M_{LO}$, respectively, and $T_s$ is the switching period.

From (1), the following equation can be established:

$$V_O = \frac{d_{HI}}{1-d_{LO}}V_{HI} + \frac{d_{LO}}{1-d_{LO}}V_{LO} \quad (2)$$

If the conduction time of the switch $M_{LO}$ of the low voltage source $V_{LO}$ is longer, the equivalent circuit of the present invention's circuit in a period is mode 2, mode 4 and mode 3 in order. Therefore, the following relation can be obtained:

$$(d_{LO}-d_{HI})T_s V_{LO}+d_{HI}T_s(V_{HI}+V_{LO})+(1-d_{LO})T_s(-V_O)=0 \quad (3)$$

The same result as (2) can be obtained by rearranging (3).

Besides, if the inductance of the inductor is very large, the variation of the current flowing through the inductor can be neglected. Therefore, both the input currents of the high and low voltage sources will equal to the inductor current. The average input currents $I_{HI}$ and $I_{LO}$ of the high and low voltage sources can be represented as:

$$I_{HI}=d_{HI} \cdot I_L \quad (4)$$

$$I_{LO}=d_{LO} \cdot I_L \quad (5)$$

On the other hand, when the switch $M_{LO}$ is off, the not-filtered output current $i_O'$ will be equal to the inductor current $i_L$. When the switch $M_{LO}$ is on, the not-filtered output current will be zero. Therefore, the following expression of the output current can be obtained:

$$I_O=(1-d_{LO})I_L \quad (6)$$

From (4), (5) and (6), the relations between the output current and the average input currents are as follows:

$$I_{HI} = \frac{d_{HI}}{1-d_{LO}} I_O \quad (7)$$

$$I_{LO} = \frac{d_{LO}}{1-d_{LO}} I_O \quad (8)$$

In practice, it is necessary to consider the problems of the input power distribution and the balance of output and input powers for the dual input power converter. For the present invention's circuit, the output and input currents can be easily controlled to meet various requirements in power balance. For instance, under the requirement of constant output power, if the input current $I_{LO}$ of the low voltage source is controlled to be constant, $d_{LO}$ can be known from (8). Because the input and output voltages in (2) are known, $d_{HI}$ can then be determined. Once $d_{HI}$ and $d_{LO}$ are known, $I_{HI}$ in (7) can be determined. In other words, under the requirement of constant output power, it is only necessary to control the magnitude of the current of the low voltage source to let the high voltage source automatically provide the shortage current for the load end. On the contrary, the current of the high voltage source can also be controlled to let the low voltage source automatically provide the shortage current for the load end.

Figure 6:
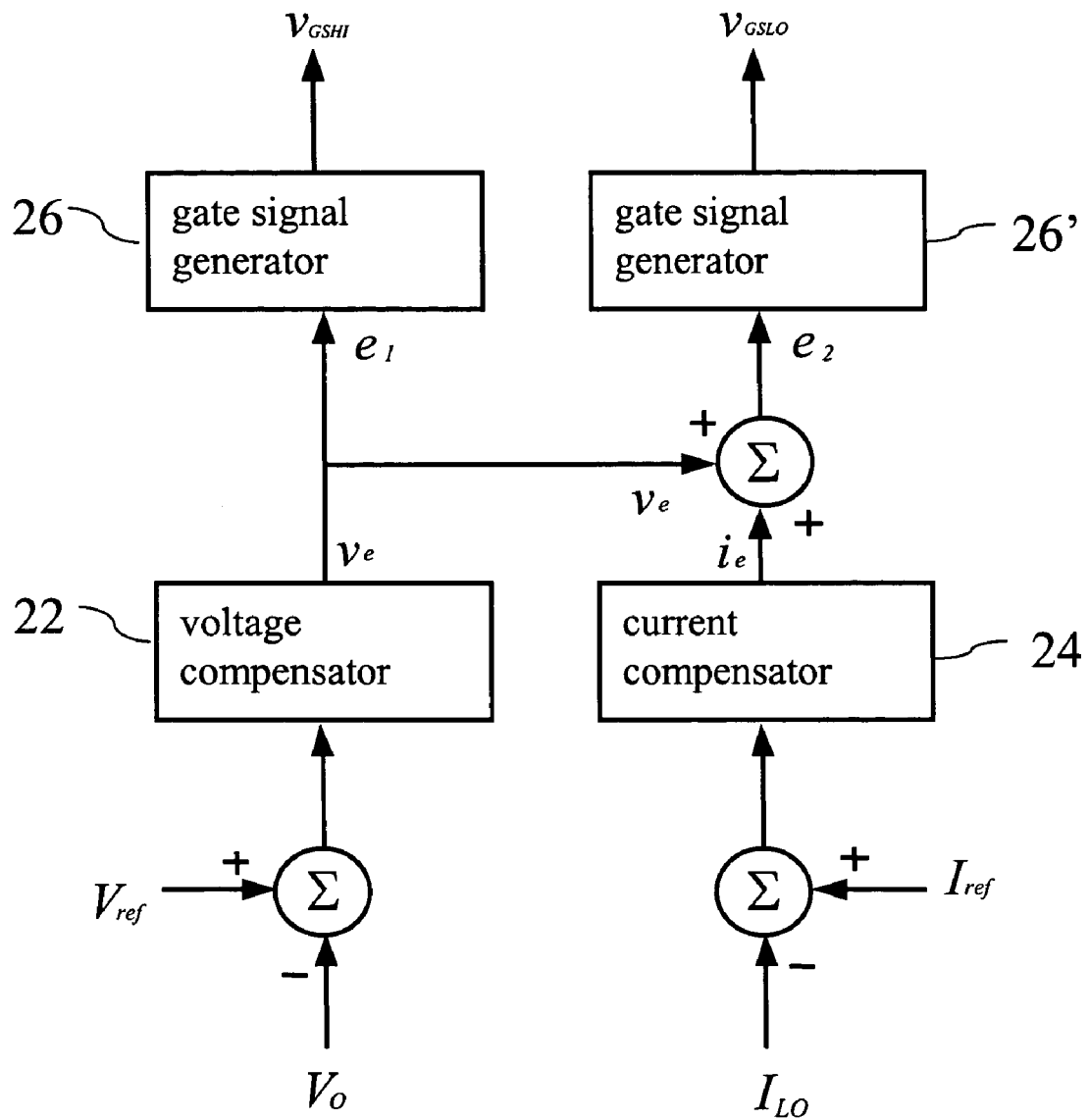
FIG. 6 is a block diagram of a control circuit according to an embodiment of the present invention.

Referring to the typical control function block diagram shown in FIG. 6, the low voltage source provides a constant power for the load end. The missing input power is provided by the high voltage source. It is only necessary to adequately adjust or vary the current reference signal $I_{ref}$ and add in an adequate voltage reference signal $V_{ref}$. A voltage compensator 22 and a current compensator 24 are used to compensate a voltage feedback control signal and a current feedback control signal for producing adequate error signals, which are provided to gate signal generators 26 and 26' to produce accurate switch driving signals. Thereby, accurate output voltage and currents can thus be obtained, distribution of the input power can be controlled, and the requirement in the balance of output and input powers can also be met. Furthermore, each DC power source can accomplish the feature of the maximum power point tracking.

Figure 7:
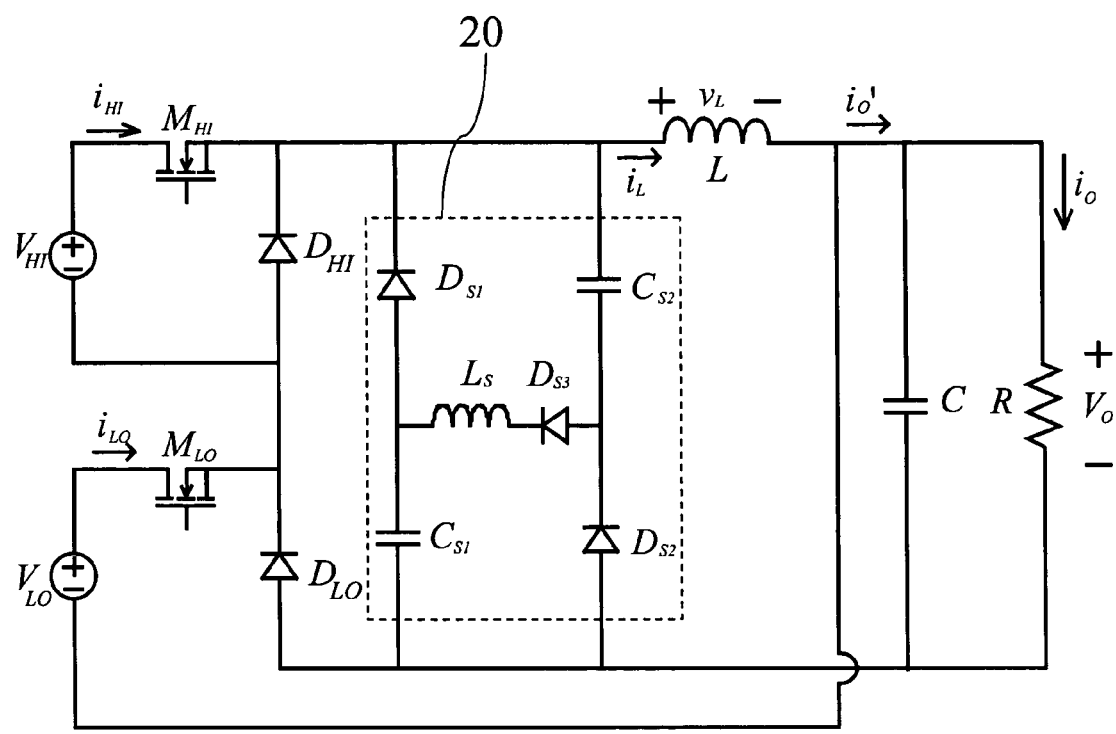
FIG. 7 is a diagram of the present invention with a passive lossless soft switching cell added.

Besides, in order to reduce the switching loss of the switches and enhance the efficiency of the whole converter, a passive lossless turn-off soft-switching cell can be added in the circuit. As shown in FIG. 7, a passive lossless turn-off soft-switching cell 20 is added in the power converter of the present invention to simultaneously reduce the turn-off switching losses of the two switches $M_{HI}$ and $M_{LO}$ when they are simultaneously off. If the present invention is operated in the control mode of synchronous turn-on, a passive lossless turn-on soft-switching cell can also be inserted. Therefore, the dual input DC—DC power converter of the present invention has the advantage of easy addition of a soft-switching cell to effectively reduce the switching loss and improve the efficiency of the power converter.

According to the present invention, the dual input DC—DC power converter of the present invention can simplify the power conversion system, improve the efficiency, and lower the cost. Moreover, the dual input DC—DC power converter can transfer power from two input voltage sources with different voltage levels(one of two voltage is higher than the output voltage while the other is lower than the output voltage).It can be applied to the application of integrating different voltage sources with unique characteristics (e.g., a hybrid generator system integrating solar energy and wind energy). If one of two input voltage sources is failed, the other can still deliver power to the load end normally, hence effectively solving the drawback and inconvenience of using a switching bypass. Besides, the present invention can allow two voltage sources simultaneously to transfer power form two different voltage sources to a load end.

While the present invention has been particularly shown and described with reference to the preferred embodiments thereof, it will be understood by those skilled in the art that various changes in form and details may be without departing from the spirit and scope of the present invention.

We claim:

1. A dual input DC—DC power converter integrating high/low voltage sources, said power converter providing an output voltage to a load end, said power converter comprising:
    an electric storage device for charging and discharging of electric energy;
    a high voltage source device whose voltage level is higher than said output voltage, a first switch being provided in said high voltage source device; and
    a low voltage source device whose voltage level is lower than said output voltage, a second switch being provided in said low voltage source device;
    whereby said low voltage source device and said high voltage source device are connected in series to form a power supply device, which is connected in series with said electric storage device, said power supply device forms a switching circuit of an effective power switch in different operation modes according to the on/off state of said two switches, when said power switch is on, said high voltage source device or/and said low voltage source device will charge said electric storage device, when said power switch is off, said electric storage device will release energy to said load end.

2. The dual input DC—DC power converter integrating high/low voltage sources as claimed in claim 1, wherein said high voltage source device comprises a high voltage level source, and said first switch is arranged at an output end of said high voltage level source.

3. The dual input DC—DC power converter integrating high/low voltage sources as claimed in claim 1, wherein said low voltage source device comprises a low voltage level source, and said second switch is arranged at an output end of said low voltage level source.

4. The dual input DC—DC power converter integrating high/low voltage sources as claimed in claim 1, wherein said first switch is a transistor.

5. The dual input DC—DC power converter integrating high/low voltage sources as claimed in claim 1, wherein said second switch is a transistor.

6. The dual input DC—DC power converter integrating high/low voltage sources as claimed in claim 1, wherein said first switch is further connected with a diode, which provides a path for the current of said electric storage device when said first switch is off.

7. The dual input DC—DC power converter integrating high/low voltage sources as claimed in claim 1, wherein said second switch is further connected with a diode, which provides a path for the current of said electric storage device when said second switch is off.

8. The dual input DC—DC power converter integrating high/low voltage sources as claimed in claim 1, wherein said electric storage device comprises:
    an inductor connected in series with said power supply device; and
    a capacitor connected in shunt with said inductor.

9. The dual input DC—DC power converter integrating high/low voltage sources as claimed in claim 8, wherein when said first switch is on and said second switch is off, said high voltage source device provides power to said load end and charges said inductor and said capacitor to form an energy charging stage in an equivalent circuit of a buck converter.

10. The dual input DC—DC power converter integrating high/low voltage sources as claimed in claim 8, wherein when said first switch is off and said second switch is on, said low voltage source device charges said inductor and said capacitor provides power to said load end to form an energy charging stage in an equivalent circuit of a buck-boost converter.

11. The dual input DC—DC power converter integrating high/low voltage sources as claimed in claim 8, wherein when said first switch is off and said second switch is off, electric energy stored in said inductor is released to said load end to form an energy discharging stage in an equivalent circuit of a buck and buck-boost converter.

12. The dual input DC—DC power converter integrating high/voltage sources as claimed in claim 8, wherein when said first switch is on and said second switch is on, said high and low voltage source devices are connected in series to charge said inductor and said capacitor to provide power to said load end to form an energy charging stage in an equivalent circuit of a buck-boost converter.

13. The dual input DC—DC power converter integrating high/low voltage sources as claimed in claim 1, wherein said first and second switches have different switching frequencies.

14. The dual input DC—DC power converter integrating high/low voltage sources as claimed in claim 1, wherein said first and second switches have synchronous switching frequencies.

15. The dual input DC—DC power converter integrating high/low voltage sources as claimed in claim 14, wherein the switching frequencies of said first and second switches are made synchronous by means of simultaneous on but consecutive off or consecutive on but simultaneous off.

16. The dual input DC—DC power converter integrating high/low voltage sources as claimed in claim 1, wherein when one of said high and low voltage source devices fails, the other one can still provide power stably.

17. The dual input DC—DC power converter integrating high/low voltage sources as claimed in claim 1, wherein said high/low voltage source device will automatically provide the required current to said load end by controlling the magnitude of the current of said low/high voltage source device under a constant output power.

18. The dual input DC—DC power converter integrating high/low voltage sources as claimed in claim 1, wherein an accurate output voltage and current can be obtained by properly adjusting a current reference signal and adding in an appropriate voltage reference signal to accomplish distribution control of the input power and the balance of the input and output powers.

19. The dual input DC—DC power converter integrating high/low voltage sources as claimed in claim 1, wherein a passive lossless turn-off soft-switching cell is added in the circuit to reduce switching losses of said two switches.

20. The dual input DC—DC power converter integrating high/low voltage sources as claimed in claim 1, wherein a passive lossless turn-on soft-switching cell is added in the circuit to reduce switching losses of said two switches.

* * * * *